United States Patent [19]

Forden

[11] 4,397,191

[45] Aug. 9, 1983

[54] LIQUID VELOCITY MEASUREMENT SYSTEM

[76] Inventor: Christopher A. Forden, 1106 Hewitt St., Huntsville, Ala. 35805

[21] Appl. No.: 325,110

[22] Filed: Nov. 27, 1981

[51] Int. Cl.$^3$ .............................................. G01F 1/66
[52] U.S. Cl. .................................. 73/861.18; 73/195; 73/227
[58] Field of Search .................... 73/861.18, 215, 227, 73/290 V, 599, 861, 195

[56] References Cited

U.S. PATENT DOCUMENTS 3,996,798 12/1976 Vander Heyden .................. 73/195
4,145,914 3/1979 Newman ............................ 73/290 V
4,159,647 7/1979 Paulsen et al. ............... 73/290 V X Primary Examiner—Charles A. Ruehl
Attorney, Agent, or Firm—C. A. Phillips

[57] ABSTRACT

A measurement system for the measurement of the velocity of liquid flow through a pipe wherein side-by-side ultrasonic transmitting and receiving transducers are positioned on a below liquid level area of the pipe and are oriented to transmit and receive, respectively, signals along essentially parallel paths which are essentially normal to the flow of fluid through the pipe. Modulation on a received signal is demodulated and the frequency of major signal excursions of the modulation are detected and employed as an indication of velocity of flow.

4 Claims, 3 Drawing Figures

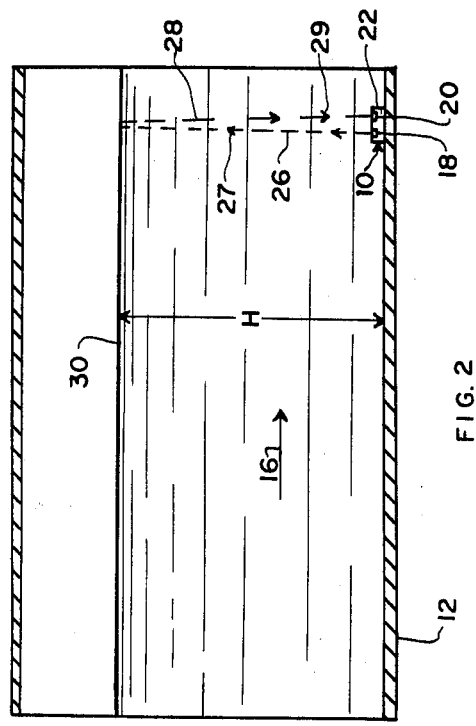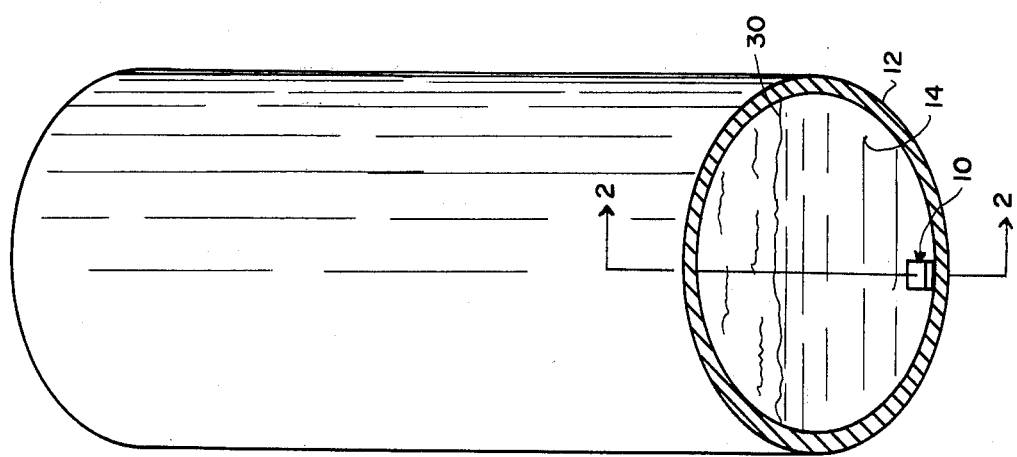

LIQUID VELOCITY MEASUREMENT SYSTEM

TECHNICAL FIELD

This invention relates generally to devices and systems for the measurement of velocity flow through pipes or other channels, and particularly to a system employing ultrasonic energy.

BACKGROUND ART

It has been previously proposed that velocity of liquid flow through a pipe be detected by the transmission and reception of ultrasonic signals on the order of 0.6 to 1.2 MHz, being transmitted and received through the side walls of a pipe through which the liquid flows. A pair of transducers, one for transmission and the other for reception, are positioned on the outside of the pipe and oriented for sound transmission across the flow of the liquid at an angle with respect to the direction of flow on the order of 60°. Such a system is described as operating on the Doppler principle of measurement wherein the velocity of flow (e.g., in feet per second), $$V = \frac{F_2 - F_1}{F_1} \times \frac{C}{\cos\theta} \times .5.$$

In this equation, C is equal to the velocity of sound in the liquid (coordinately in feet per second), $F_1$ is the frequency of transmitted ultrasonic sound, $F_2$ is the received frequency (shifted by the Doppler shift), and $\theta$ is equal to the angle between the direction of flow and the direction of transmission of the signal.

Two problems have been noted with respect to this type system. One is that velocity readouts tend to be effected by depth. A second one is that difficulties are often experienced in reading relatively low values of flow, for example, on the order of 0.5 to 3 feet per second, which is particularly important in the measurement of certain types of flow, e.g., flow of sewage.

It is the object of this invention to provide an improved ultrasonic velocity measurements system for liquid flows in pipes which eliminates the stated difficulties.

DISCLOSURE OF THE INVENTION

In accordance with this invention, a liquid velocity measurement system for liquid flowing through a pipe or other channel is constructed wherein an acoustical energy signal is transmitted upward from a first ultrasonic transducer to the surface of liquid in the pipe along a path normal, or essentially normal, to the flow of liquid, and a reflected portion of this signal is detected by a second transducer positioned beside the first transducer. The detected signal is amplified and the modulation on it demodulated and recovered. The modulation is then subjected to amplitude clipping wherein signal excursions of major amplitudes are converted to pulses. The pulses are then counted and the count divided by a constant to provide an output indicative of velocity of fluid flow through the pipe.

BRIEF DESCRIPTION OF THE DRAWINGS

FIG. 1 is a pictorial view of a section of pipe through which there is liquid flow, the pipe being cut through to illustrate the relationship of a velocity sensor to the column of liquid in the pipe.

FIG. 2 is a sectional view taken along line 2—2 of FIG. 1.

DETAILED DESCRIPTION OF THE DRAWINGS

Figure 3:
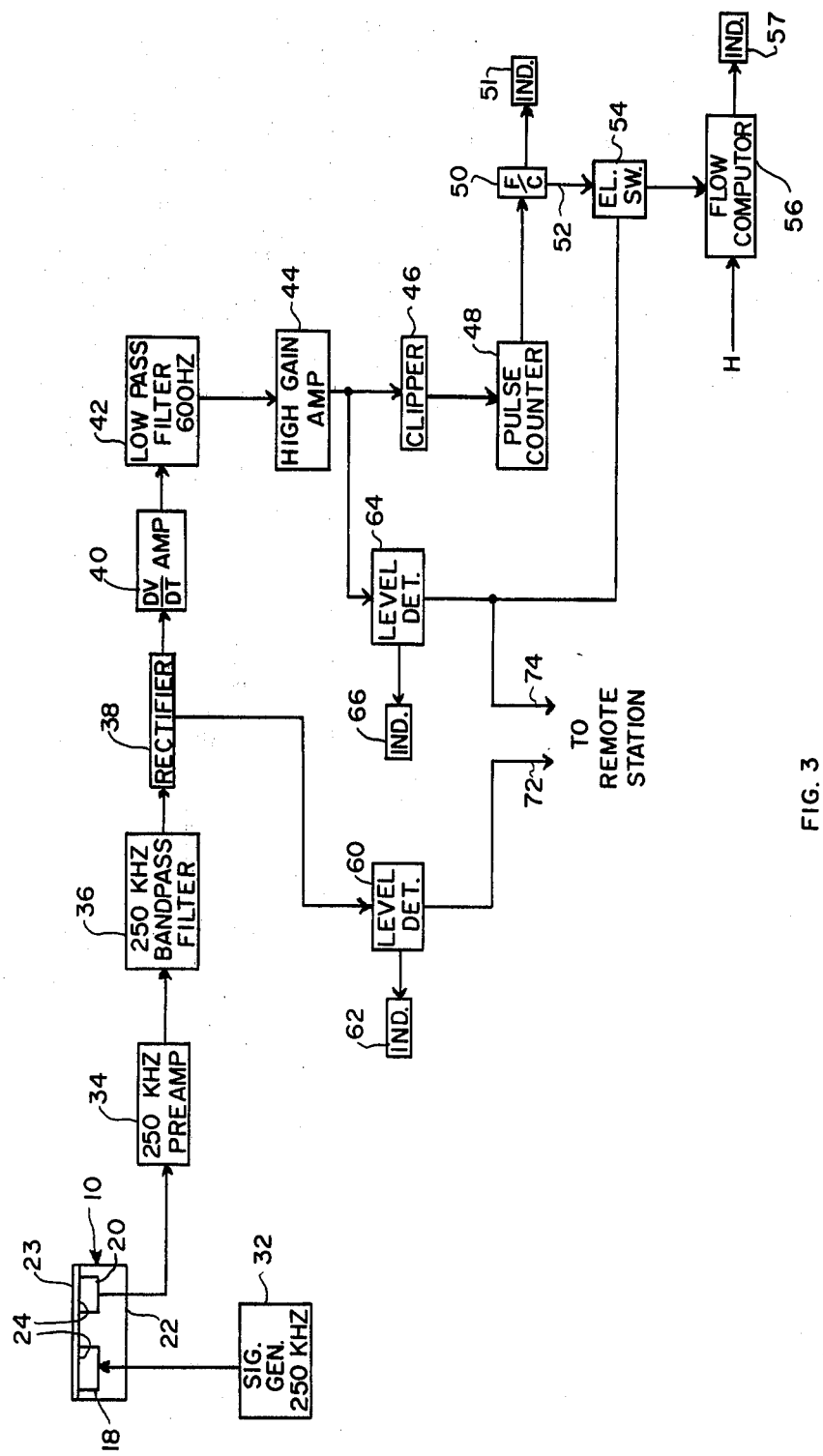
FIG. 3 is an electrical schematic diagram of the system of the present invention.

FIGS. 1 and 2 illustrate the placement of a transducer assembly 10 on the bottom of a section of pipe 12 through which there is flowing a fluid 14, for example, in the direction of arrow 16. As illustrated, transducer assembly 10 employs two piezoelectric ultrasonic units chosen to operate at a selected frequency, for example, 250 KHz. These transducers can be essentially identical, with one of them, transducer 18, functioning as a transmitter, and transducer 20 functioning as a receiver.

As illustrated in FIG. 3, transducers 18 and 20 are encapsulated in a container 22 which is affixed (FIGS. 1 and 2) to a bottom region (or perhaps raised somewhat to a side position above the very bottom of pipe 12 to avoid debris) of pipe 12. The transducers are affixed to a thin (0.010 to 0.040 inch in thickness) sheet 23 of a plastic material, such as ABS, or other like material, with their active responsive surfaces 24 oriented generally horizontally to accomplish transmission paths, preferably vertically, as illustrated by paths 26 and 28 in FIG. 2 toward the surface 30 of liquid flowing through pipe 12. The transducers should be located back from the exit end of a pipe some distance, typically 0.8 the diameter of the pipe, in order to reduce or eliminate signals emanating from exiting flow.

Signal generator 32 provides a 250 KHz electrical signal which powers transmit transducer 18 to provide the upward emission or path 26 as indicated by arrows 27 in FIG. 2. Reflected energy from surface 30 moves downward as per arrows 29 on a parallel path to receive transducer 20. During its transit, the acoustical signal is modulated by the liquid movement and the signal received by receive transducer 20. This modulation signal contains a noise signal content and signal variations which have been determined to relate directly to velocity of flow, and wherein this velocity is equal to the detected frequency signal divided by a constant, which has been found to lie in the range of 40 to 160, typically 80. Thus, for example, with an observed frequency of 100 and a constant of 80, the velocity flow would be approximately 1.25 feet per second.

In order to actually detect and utilize this velocity related frequency to obtain a readout of velocity, signal processing of the signal from transducer 20 is effected by the circuitry shown in FIG. 3. Thus, the signal output of transducer 20 is first amplified in preamplifier 34, and its output is passed through 250 KHz band-pass filter 36 wherein frequencies outside of approximately ±10% of the 250 KHz frequency are substantially eliminated. The modulated output of filter 36 is detected by an amplitude modulation detector, rectifier 38. As a result, there is provided as an output of rectifier 38 a varying D.C. signal which is essentially the desired velocity related frequency signal rather significantly accompanied by noise frequencies.

Next, the signal output of rectifier 38 is differentiated and amplified by differentiating amplifier 40, which effects a 6 db per octave increase in output with frequency. Then, the output of differentiating amplifier 40 is passed through a low-pass filter 42 wherein signals significantly above 600 Hz are eliminated.

The output of filter 42 is amplified in amplifier 44, and the amplified signal is fed through clipper 46, which essentially translates the desirable signal frequency into a pulse output at that frequency. This pulse output is fed to pulse counter 48, which then effects a count of the pulses over a selected period of time and provides a count rate output. The count rate output is then fed to divider 50, which divides the count rate by a selected constant, e.g., 80. The output of divider 50 is representative of velocity in feet per second, and this is read out by a conventional indicator, e.g., a digital readout indicator 51.

Additionally, or alternatively to, the output of divider 50 is provided on signal line 52 and made available through a manually operated, or electronic, switch 54 to flow computer 56. Typically, flow computer 56 would multiply the velocity of liquid flowing in pipe 12 times the wetted area of pipe 12 as illustrated by the portion of pipe 12 filled with liquid shown in FIGS. 1 and 2 to provide as an output a volume-per-unit of selected time. The wetted area, in such case, is a conventional computation obtained by flow computer 56 by relating an H, or height, dimension as shown in FIG. 2 to the radius of the pipe. Thus, as shown, one input of flow computer 56 is the quantity H, and the other is the quantity V from divider 50. Alternately, flow computer 56 may include computation means for computing velocity directly from H, the slope of the pipe, and a constant of an approximate value of 0.013. Such computation is made in accordance with what is termed a Manning equation, and an illustration of this is shown in U.S. Pat. No. 4,211,111. It is to be noted in the patent that the term ($\pi R/2$) in block 126 should be ($\pi R^2/2$).

Thus, in operation, with switch 54 in its open state, fluid flow would be computed by flow computer 56 solely in terms of the Manning equation, and when in the closed position, flow computer 56 would employ the velocity output of divider 50 in the computation of volume of flow as described above.

The output of flow computer 56 is provided to flow indicator readout 57 or to such other computational elements as might be involved in indicating or storing a value, for example, computational elements for the computation of flow gains as between ends of a pipe or pipeline.

FIG. 3 also illustrates signal means for identifying signal failures in certain portions of the system which, for example, may result from a faulty cable extending from an underground pipe or, of course, from other failures. Thus, as shown, a signal output is coupled from rectifier 38 to level detector 60, which is adapted to provide an output when at least a selected level of input signal is available from rectifier 38. Level detector 60 then provides an output to indicator 62 which indicates this level as present. Alternately, the indicator may be so arranged that it indicates when no such signal is present. Thus, an indication of the state of operation of the system up to this point is obtained.

Additionally, a signal output from high gain amplifier 44 is fed to a second level detector 64 which provides as an output a signal to indicator 66 when the signal output of amplifier 44 is at least up to a selected level. Indicator 66 then is adapted to indicate when the signal level is above its selected value or below it. Accordingly, by the two indications, information is available which would indicate when a problem exists and the portion of the system at fault.

Additionally, signal lines 72 and 74 are shown as coupling outputs from level detectors 60 and 64 to a remote station where the signal condition might be monitored, as desired. One instance of further utilization of the output of level detector 64 would be to operate electronic switch 54, and thereby to provide a velocity signal to flow computer 56 when the circuit operation was indicated as being effective by there being an output from level detector 64 present.

In accordance with the foregoing, the applicant has provided an improved system of determining velocity of flow through a pipe which has been found is of particular value in measuring sewage flow wherein flow rates are in the range of 0.2 to 10 feet per second. Of course, it is applicable to the measurement of fluid flows of other types of liquids and at other rates.

I claim:

1. A measurement system for measuring flow of a liquid through a channel comprising:
   transducer means oriented and positioned in a lower region of the inside of a channel to transmit and receive acoustic energy between said transducer means and an upper surface of the fluid and along a path which is essentially normal to the direction of flow through the channel;
   said transducer means comprises transmit and receive, side by side, transducers;
   signal generating means for applying an ultrasonic signal to said transmit transducer, wherein an acoustic signal is emitted along said path to the surface of the fluid and reflected back to said receive transducer;
   signal amplification means responsive to the output of said receive transducer for providing an amplified version of the output of said receive transducer over a selected frequency range;
   signal detection means responsive to the output of said amplification means for providing as an output modulation appearing on said signal;
   filter means responsive to the output of said detection means for providing as an output signals within a selected frequency range;
   amplitude limiting means responsive to the output of said filter means for providing output pulses corresponding to signal variations of a selected magnitude;
   pulse counting means responsive to the output of said amplitude limiting means for providing an output proportional to the frequency of output pulses; and
   velocity computation means responsive to the output of said pulse counting means for providing as an output an indication of velocity flow through said channel.

2. A system as set forth in claim 1 comprising:
   first level detection means responsive to the output of said signal detection means for providing a first output when the output of said signal detection means exceeds a selected level; and
   second level detection means responsive to the output of said filter means for providing a second output when the output of said filter means exceeds a selected level.

3. A system as set forth in claim 2 further comprising flow computation means selectively responsive to the output of said velocity computation eans for providing as an output an indication of the volume of flow through said channel.

4. A system as set forth in claim 3 which includes an electronic switch responsive to said second level detection means for coupling an output of said velocity computation means to said flow computation means.

* * * * *